United States Patent [19]

Aguet

[11] 3,992,876
[45] Nov. 23, 1976

[54] COMBINED GAS TURBINE AND STEAM POWER PLANT

[75] Inventor: Emile Aguet, Winterthur, Switzerland

[73] Assignee: Sulzer Brothers Limited, Winterthur, Switzerland

[22] Filed: Jan. 13, 1975

[21] Appl. No.: 540,501

[30] Foreign Application Priority Data
Jan. 15, 1974   Switzerland............................ 493/74

[52] U.S. Cl. ............................ 60/39.12; 60/39.18 B
[51] Int. Cl.² ...................... F02C 7/02; F02B 43/00
[58] Field of Search ......... 60/39.18 B, 39.12, 39.05, 60/39.46, 626; 122/7 R, 7 B; 123/1 A

[56] References Cited
UNITED STATES PATENTS

| | | | |
|---|---|---|---|
| 1,151,676 | 8/1915 | Foersterling | 122/7 R |
| 2,787,121 | 4/1957 | Bouffant | 60/39.46 |
| 3,561,405 | 2/1971 | Tramota | 122/7 R |
| 3,577,877 | 5/1971 | Warne | 60/39.14 |
| 3,830,062 | 8/1974 | Morgan | 60/651 |
| 3,841,270 | 10/1974 | Sokolowski | 122/7 R |

*Primary Examiner*—Carlton R. Croyle
*Assistant Examiner*—L. J. Casaregola
*Attorney, Agent, or Firm*—Kenyon & Kenyon Reilly Carr & Chapin

[57] ABSTRACT

The plant has a combustion chamber which is connected to a thermal preparation plant for fuel in order to receive prepared fuel. The thermal preparation plant has a heat exchanger for condensing heavy sulphur-containing fractions of heavy oil. This heat exchanger is connected in parallel with the evaporator of the steam generator to receive the working medium for the production of steam at the same steam pressure as in the evaporator. A second fuel supply is connected to the combustion chamber to supply fuel when the preparation plant is shut down. A burner is also connected to the steam generator to heat the various heating surfaces for producing steam when the preparation plant is shut down.

3 Claims, 1 Drawing Figure

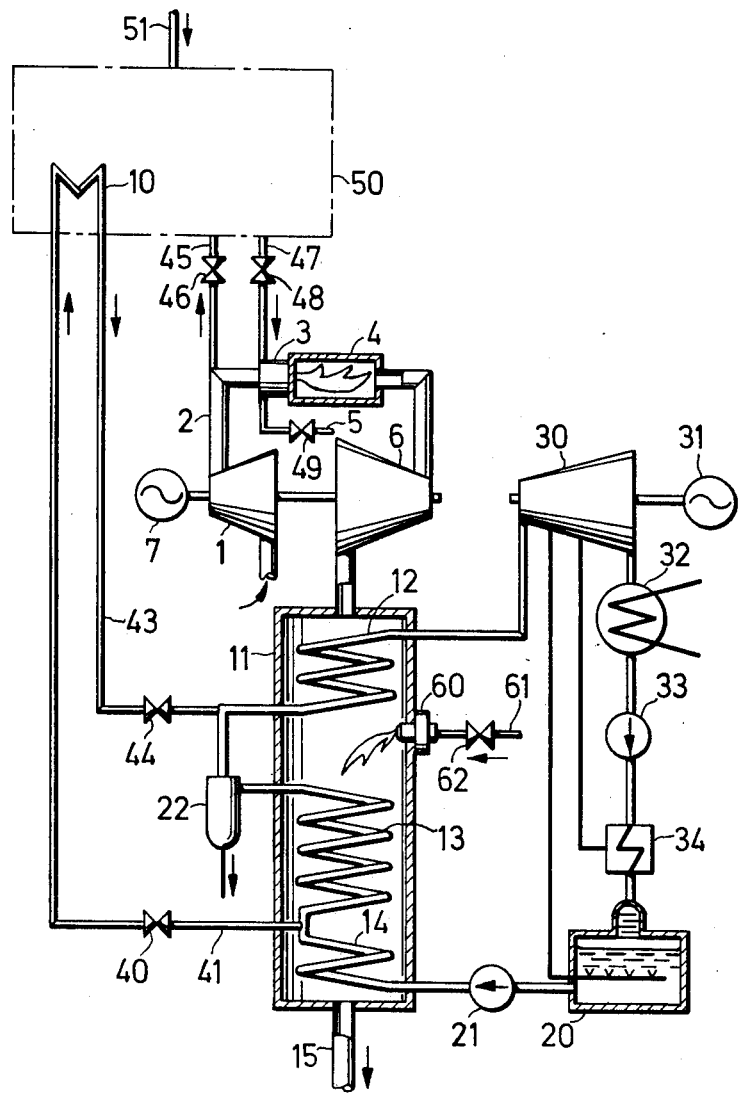

COMBINED GAS TURBINE AND STEAM POWER PLANT

This invention relates to a combined gas turbine and steam power plant.

Combined gas turbine and steam power plants have been known. For example, such plants generally have a group comprising a compressor, combustion chamber and gas turbine as well as a steam generator which is disposed after the gas turbine and which has, disposed in consecutive relationship in the exhaust gas flow of the gas turbine, heating surfaces for a superheater, evaporator and feed-water preheater. The combustion chamber of the group is also connected to a thermal preparation plant for solid or liquid fuel, in which plant, for instance, harmful substances such as sulphur are removed from the fuel.

It is an object of the invention to improve such a plant so that the plant can operate at high efficiency and without loss of overall power in the event the fuel preparation plant is rendered inoperative.

Briefly, the invention is directed to a combined gas turbine and power plant having a compressor, combustion chamber and gas turbine as well as a steam generator having a superheater, evaporator and feed-water preheater and a thermal preparation plant for fuel having a chamber in which impurities can be removed from the fuel prior to the supply of the fuel to the combustion chamber. In accordance with the invention, a heat exchanger is incorporated within the thermal preparation plant. This heat exchanger is connected in parallel with the evaporator relative to a flow of working medium through the preheater, evaporator and superheater in order to produce steam at the same pressure as in the evaporator. This steam is supplied to the superheater in the steam generator. In addition, this heat exchanger acts as a cooler within the thermal preparation plant for cooling the fuel supplied from the preparation plant to the combustion chamber.

In addition, a second fuel supply is connected to the combustion chamber for supplying fuel to the chamber independently of the thermal preparation plant. In a similar fashion, a burner is also disposed in the steam generator in a zone between the superheater and evaporator. This burner has a fuel supply independent of the thermal preparation plant.

Various valve means are also provided to selectively control the flow of preheated working medium to the cooler, the flow of fuel from the thermal preparation plant to the combustion chamber and the flows of fuel from the second fuel supply to the combustion chamber and to the burner.

Under normal conditions, the combined plant is run from the fuel supplied from the thermal preparation plant. However, should the thermal preparation plant be shut down, then the combined plant is run off the second fuel supply to the combustion chamber and the burner in the steam generator. In this way, the temperatures and the flow rates at the important places of the steam generator remain unaltered.

These and other objects and advantages of the invention will become more apparent from the following detailed description and appended claims taken in conjunction with the accompanying drawing in which:

The drawing schematically illustrates a simplified version of a combined plant according to the invention.

Referring to the drawing, the combined gas turbine and steam power plant includes an air compressor 1 which receives and compresses a flow of air as is known, a combustion chamber 4 which houses a burner 3 which receives a flow of compressed air from the compressor 1 via a line 2 and prepared fuel from a thermal preparation plant 50 via a line 47 closeable by a valve 48.

The exit of the combustion chamber 4 is connected to the entry of a gas turbine 6 which is disposed on the same shaft as the compressor 1; an electric generator 7 being coupled with such shaft. The gas turbine 6 which receives the flow of gas from the combustion chamber 4 outputs into a steam generator 11 which has, disposed in consecutive relationship in the direction of exhaust gas flow from the gas turbine 6, a superheater or heating surface 12 for superheating, an evaporator or heating surface 13 for evaporation and a preheater or heating surface 14 for feed-water preheating. The gas exit of the steam generator 11 communicates via a line 15 with a flue (not shown).

A water separator 22 is disposed in the flow of working medium between the evaporator 13 and superheater 12 for separating the mixture of steam and water arriving from the evaporator 13. In addition, a heat exchanger 10 is connected in parallel to the evaporator 13 relative to the flow of working medium. This heat exchanger 10 is disposed in the thermal preparation plant 50 and is connected, by way of a line 41 closeable by a valve 40, to the exit of the preheater 14 and, by way of a line 43 closeable by a valve 44, to the steam line which extends from the separator 22 to the superheater 12. Alternatively, the line 43 can be connected between the evaporator 13 and the separator 22.

The superheater 12 outputs to the entry of a steam turbine 30 for driving an electric generator 31. The steam turbine 30, in turn, outputs by way of a condenser 32, a condensate pump 33 and a preheater 34 heated by bled steam to a feed water tank 20. The preheater 14 of the steam generator is connected to the tank 20 by way of a feed pump 21.

A burner 60 is disposed in the steam generator 11 in a zone between the superheater 12 and the evaporator 13 and is connected, by way of a line 61 closeable by a valve 62, to a fuel supply (not shown) independent of the preparation plant 50.

The burner 3 is also associated with a line 5 which can be closed by a valve 49 and through which the burner 3 can be connected to a fuel supply independent of the preparation plant 50. Line 2 is connected, through a line 45 closeable by a valve 46, to the preparation plant 50 to which fuel is supplied for preparation through a line 51.

The thermal preparation plant 50 of itself does not form part of this invention and so has not been shown in great detail. The fuel which this plant 50 is required to prepare, which may be solid or liquid, for instance, heavy oil, is heated in the plant 50 and some of the fuel is burned in cooperation with the compressed air supplied through line 45. The unburnt residue of the fuel is evaporated and cracked. By means of the heat exchanger 10, the heavy sulphur-containing fractions of the heavy oil are condensed while the light fractions pass as combustion gas through line 47 to the combustion chamber 4 for combustion therein. The heat exchanger 10 thus acts as a cooler for cooling the fuel supplied from the plant 50 to the combustion chamber 4. The heavy fractions can be further processed, for instance, to yield sulphur. When the heavy fractions condense on the heat exchanger 10, which is supplied with preheated feed water through line 41, the feed water evaporates at the same pressure as in evaporating heating surface 13 so that the steam produced in the heat exchanger 10 is admixed via line 43 with the steam produced by the evaporator 13 before the superheater 12. The two flows of steam then both pass to the superheater 12 and then to the steam turbine 30.

When the combined plant is operating normally, the valves 40, 44, 46, 48 are open and the valves 49, 62 closed. The prepared fuel from the preparation plant 50 therefore passes to the combustion chamber 4 and a large proportion of the steam to be expanded in turbine 30 is raised by the heat exchanger 10. The remainder of the required steam is raised by the evaporator 13 through the agency of the exhaust gas flow from the gas turbine 6. When it is required to inspect the preparation plant 50, the valves 40, 44, 46, 48 are closed to cut the plant 50 out of operation, and the valves 49 and 62 are opened so that burner 3 and the additional burner 60 receive fuel supplied from a single source or two separate sources, in each case independently of the plant 50. In the latter case, the two sources may supply different fuels. The heating on the evaporator 13 provided by the extra burner 60 raises an extra quantity of steam to replace the quantity normally produced by means of the heat exchanger 10. The combined plant can therefore operate on full power even when the plant 50 is inoperative.

What is claimed is:

1. A combined gas turbine and steam power plant comprising
   a compressor for compressing a flow of air;
   a combustion chamber for forming a hot gas from a flow of compressed air from said compressor and a supply of fuel;
   a gas turbine for receiving a flow of hot gas from said combustion chamber;
   a steam generator connected to said gas turbine to receive a flow of exhaust gas therefrom, said generator having a superheater, evaporator and feedwater preheater consecutively disposed in the flow path of the exhaust gas;
   a thermal preparation plant for fuel having a chamber for removing impurities from the fuel, said preparation plant being connected to said combustion chamber to supply fuel thereto;
   a heat exchanger within said thermal preparation plant, said heat exchanger being connected in parallel with said evaporator relative to a flow of working medium through said preheater, evaporator and superheater for producing steam at the same pressure as in said evaporator for delivery to said superheater and for cooling the fuel supplied from said thermal preparation plant to said combustion chamber;
   a second fuel supply connected to said combustion chamber for supplying fuel thereto independently of said thermal preparation plant; and
   a burner disposed in said steam generator between said superheater and said evaporator, said burner having a fuel supply independent of said thermal preparation plant.

2. A plant as set forth in claim 1 which further comprises valve means for selectively controlling a flow of preheated working medium through said cooler, a flow of fuel from said thermal preparation plant to said combustion chamber, a flow of fuel from said second fuel supply to said combustion chamber and a flow of fuel from said fuel supply independant of said thermal preparation plant to said burner.

3. A plant as set forth in claim 1 which further comprises a steam turbine connected to said steam generator to receive a flow of steam from said superheater.

* * * * *